June 17, 1969  C. M. HAWKINS  3,449,926

SHAFT COUPLING

Filed Aug. 16, 1967

INVENTOR.
BY Cyril M. Hawkins
Paul Fitzpatrick
ATTORNEY

United States Patent Office 3,449,926
Patented June 17, 1969

3,449,926
SHAFT COUPLING
Cyril M. Hawkins, Indianapolis, Ind., assignor to General Motors Corporation, Detroit, Mich., a corporation of Delaware
Filed Aug. 16, 1967, Ser. No. 660,976
Int. Cl. F16d 3/00, 3/18, 3/54
U.S. Cl. 64—6          6 Claims

ABSTRACT OF THE DISCLOSURE

An axially adjustable coupling between telescoping compressor and turbine shafts of a gas turbine engine. A thrust nut threaded on the inner shaft engages a shoulder on the outer shaft for transmission of thrust. The shafts are splined together for transmission of torque. The nut is axially adjusted by rotating it on the threads and is locked in place by a detent device splined to the nut and having a detent relation with the inner shaft. A special tool can engage the device to release the detent and turn the nut. The detent device and inner shaft are configured so that the tool cannot be removed unless the turning is stopped at a position in which the detent can engage.

---

My invention relates to shaft couplings, particularly for gas turbine engines, and to a means for locking a nut to a shaft or the like which provides safety features preventing removal of a tool which adjusts the nut unless the lock means for the nut is in operative position.

The invention has particular applicablity to gas turbine engines in which it is desirable to couple a turbine shaft to the shaft of a compressor driven by the turbine and in which axial adjustment of the position of the turbine with respect to the compressor is required. It is important that the adjustment be preserved and that the thrust nut be unable to change position, particularly if such change might result in release of the thrust connection between the shafts. My invention provides a safe and secure lock preventing any relative rotation of the thrust nut and the shaft to which it is threaded, which is readily adjustable by a tool inserted through one shaft, and which provides a safety interlock such that the tool cannot be removed after the nut has been adjusted unless it has been stopped at a position where the detent is effective. This provides an important safety factor, making it impossible for a mechanic to inadvertently fail to leave the thrust nut in a proper operating position.

The preferred embodiment of my shaft coupling embodies some features similar to those shown in U.S. Patent No. 2,785,550 of Petrie which discloses a thrust and torque transmitting coupling between turbine and compressor shafts with provision for axial adjustment. However, as will be clear from the succeeding description of the preferred embodiment of my invention, it involves features providing for easier adjustment and greater security than the structure described in the patent.

The principal objects of my invention are to provide an improved axially-adjustable connection between coaxial shafts, to provide such a coupling easily adjustable and failsafe against misadjustment, and to provide a combination of a nut lock and tool for operating the nut such that the nut cannot be misadjusted, since the tool is locked in place unless the nut is in a proper angular position.

The nature of my invention and the advantages thereof will be clear to those skilled in the art from the succeeding detailed description of the preferred embodiment of the invention and the accompanying drawings thereof.

Figure 1:
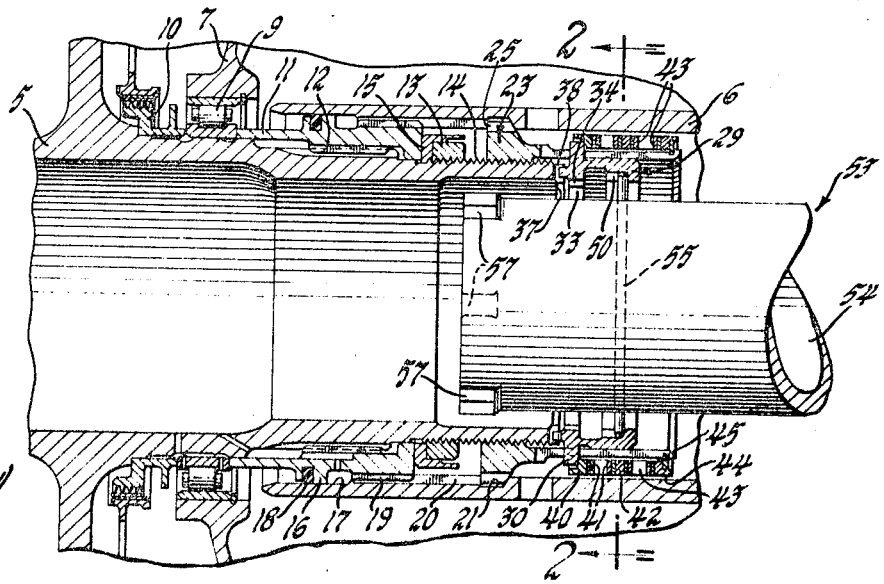
FIGURE 1 is a partial sectional view of a gas turbine engine taken on a plane containing the axis of rotation of the shafts.
Figure 2:
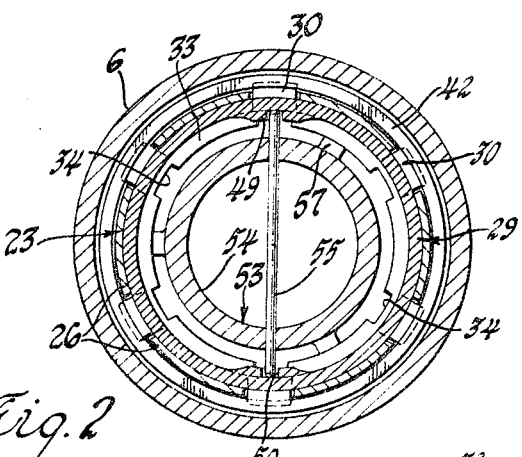
FIGURE 2 is a cross-sectional view of the same taken on the plane indicated by the line 2—2 in FIGURE 1.

Referring to the drawings, a shaft 5, which specifically is a stub shaft of the compressor of a gas turbine engine, is coupled to the forward end of a shaft 6, which specifically is a shaft of a turbine of the engine. The compressor shaft is supported by a fixed support 7 in the engine and a bearing 9 and an additional bearing forwardly of the compressor (not illustrated). A labyrinth seal ring 10 on shaft 5 may cooperate with the fixed structure to minimize leakage. The inner race of bearing 9 abuts the seal ring 10 and a splined collar 11 fixed on the shaft abuts the inner race. The splined collar 11 is splined at 12 to shaft 5 and is held in place by a nut 13 on threads 14 on the exterior of shaft 5, the nut 13 being locked by a conventional locking washer 15. Note that the splined collar 11 is piloted on shaft 5 at both ends and splined to it so that it becomes in effect an integral part of shaft 5.

The collar 11 includes a flange 16 which provides a pilot radially locating the forward end portion 17 of shaft 6 which slides over flange 16 when the assembly is made. An O-ring oil seal 18 is provided adjacent the flange 16. External splines 19 on collar 11 and internal splines 20 in shaft 6 non-rotatively couple shafts 5 and 6 together while providing for disconnection of the shafts. Splines 20 terminate in an annular recess 21 in the interior of shaft 6 which receives a thrust nut 23 adjustable on threads 14. The periphery of the thrust nut is splined to provide projections 25 which may travel through the splines 20 of shaft 6 but which are displaced relative to the splines 20 so that the forward face of nut 23 bears against splines 20 when the assembly is completed. Nut 23 may also bear against the shoulder at the rear of recess 21 but, in normal operation of the engine in question, the thrust is in the other direction.

Figure 3:
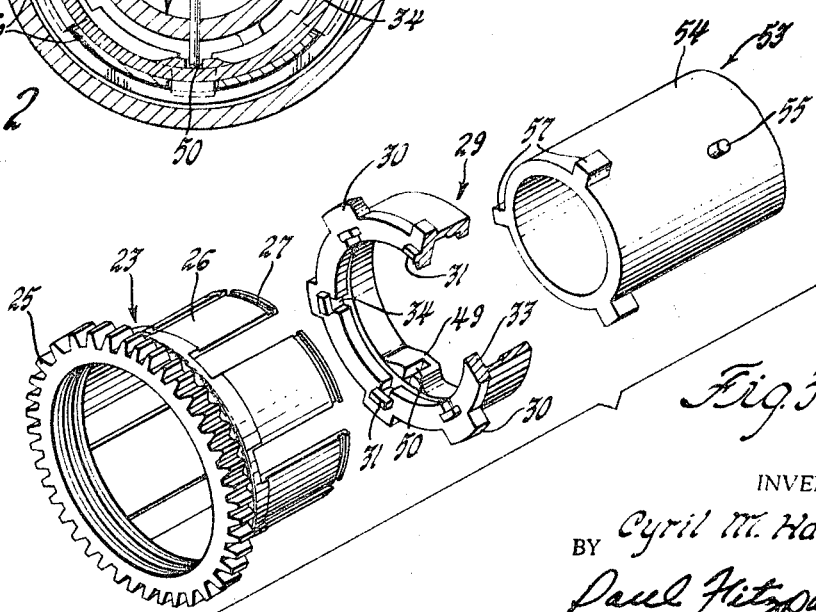
FIGURE 3 is an exploded axonometric view showing parts of the coupling and the adjusting tool.

The thrust nut 23 includes a part extending axially defined by fingers 26, six in number in the present instance, the inner and outer surfaces of these fingers being parts of an interrupted cylinder. A snap ring groove 27 extends around the rear end of fingers 26. Fingers 26 serve to couple nut 23 to a locking device or lock ring 29. This, as shown most clearly in FIGURE 3, is a generally annular or ring-shaped body which lies within the fingers 26 when the coupling is assembled and which has outwardly extending bosses 30 which interdigitate with the finger 26. The lock ring 29 bears six detent teeth 31 extending from its forward face circumferentially aligned with bosses 30. The lock ring also includes an inwardly directed flange 33 which is interrupted by six notches 34 aligned with bosses 30.

The rear end of shaft 5 has an inwardly extending flange 37. Six equally spaced radial slots 38 are cut in the end of shaft 5, extending through the flange 37. In the assembly of the device the detent teeth 31 on lock ring 29 engage in the slots 38 to non-rotatively lock ring 29 to shaft 5. The lock ring 29 is biased into engagement with shaft 5 by a spring arrangement illustrated in FIGURE 1. A front ring 40 abuts the outer ends of bosses 30. Two wave ring springs 41 nested side by side are lodged between ring 40 and a middle ring 42 which is a simple annulus. A second pair of nested wave ring springs 43 are disposed between ring 42 and a rear ring 44 which is retained on thrust nut 23 by a contracting snap ring 45 lodged in the groove 27 of the fingers.

The lock ring 29 has provision for coupling to a special tool by which it is released from its detent relation with shaft 5 and is rotated, thereby to rotate and adjust thrust nut 23. Two diametrically opposite bosses 49 extend from the inner surface of the rear end of lock ring 29. Sockets 50 extend from the forward edge of these bosses partly through the bosses.

The tool 53 by which the release of the detent and adjustment of the nut are effected comprises a shaft 54, of sufficient length to reach the other end of the turbine shaft 6, which has a transverse pin 55 extending through it of such length as to be engageable in the sockets 50. When the tool is inserted in such angular relation that pin 55 clears the bosses 49, it may be advanced adjacent to the flange 33, rotated, and pulled backwardly so as to slide into the sockets 50. By pulling further backward on tool 53, the lock ring is released from the slots 38 against the force of the springs 41 and 43. The lock ring 29 may then be rotated by shaft 54 to turn thrust nut 23 in either direction to adjust the axial position of the turbine.

The device includes a safety interlock making it impossible to remove the tool 53 unless the detent teeth 31 are aligned with slots 38. The forward end of shaft 54 bears three equally spaced lugs 57 which may pass through notches 34 and slots 38 as the tool is inserted with the pin 55 out of angular alignment with bosses 49. However, since notches 34 and slots 38 are aligned only when detent teeth 31 are aligned with slots 38, the tool cannot be removed except when the lock ring is in such position. Otherwise, the lugs 55 upon entering slots 38 are blocked by flange 33. With the lock ring in such angular position, as the tool 53 is moved forward to disengage pin 55 from the lock ring, the springs 41, 43 will engage the detent.

The structure described in which there are six detent teeth 31 and a corresponding number of slots 38 provides for locking the thrust nut 23 at intervals of 60° of rotation. Obviously, the device may be modified to provide a much greater number of indexing points if desired.

The shaft coupling or nut lock according to my invention provides a direct connection between the threaded shaft and the nut through the single lock device 29 which is positively nonrotatively coupled to both, which is easily adjustable by the tool 53, and which cannot be left in an intermediate position in which the projections or splines 25 on the thrust nut might be aligned with the spaces between splines 20 of shaft 6.

The detailed description of the preferred embodiment of my invention for the purpose of explaining the principles thereof is not to be considered as limiting or restricting the invention, as many modifications may be made by the exercise of skill in the art without departing from the scope of the invention.

I claim:
1. A locking arrangement comprising, in combination, a first threaded member,
a second threaded member in threaded engagement with the first member,
a locking device mounted for movement axially of the threaded portions of the members,
an axially slidable non-rotatable connection between the device and one said member,
a detent between the device and the other said member, effective to prevent relative rotation of the device and other member, disengageable by axial movement of the device,
means biasing the device into detent engaging position, coupling means on the device engageable with a tool operable to release the detent and to rotate the device and thereby the said one member,
and blocking means on the device and the said other member rendered operable by relative rotation of the device and other member to a condition engageable with the tool to block removal of the tool from the locking arrangement whenever the angular relation of the device and other member departs from a relation allowing engagement of the detent.

2. An arrangement as recited in claim 1 in which the coupling means defines sockets opening axially of the locking device toward the detent engaging position.

3. An arrangement as recited in claim 1 in which the blocking means includes flanges on the device and member having openings therein aligned when the angular relation of the device and member is such to allow engagement of the detent.

4. An arrangement as recited in claim 3 in which the coupling means defines sockets opening axially of the locking device toward the detent engaging position.

5. A locking arrangement as recited in claim 4 in combination with a tool having driving means engageable in the sockets and interlock means configured to engage one said flange when the openings are not aligned.

6. An axially adjustable shaft coupling comprising, in combination, a first hollow shaft, a second hollow shaft telescoped over the first shaft, spline means nonrotatively coupling the shafts, a thrust nut threaded onto the first shaft, projections on the nut and second shaft normally engaged for transmission of axial force between the shafts and releasable by relative rotation of the nut and the second shaft to permit disassembly of the shafts, and releasable means effective to lock the nut nonrotatively to the first shaft with the projections in engaging relation including a part directly nonrotatively engaging the nut and the first shaft, in combination with a tool operable to engage the said part to release the lock and rotate the thrust nut and means on the first shaft and the said part effective to block removal of the tool when the lock means is out of an angular relation permitting engagement of the lock.

References Cited
UNITED STATES PATENTS

| | | | |
|---|---|---|---|
| 2,744,395 | 5/1956 | Massey et al. | 64—9 |
| 2,785,550 | 3/1957 | Petrie | 64—9 |
| 2,836,041 | 5/1958 | Petrie | 64—9 |
| 2,864,244 | 12/1958 | Prachar | 64—9 |

HALL C. COE, *Primary Examiner.*

U.S. Cl. X.R.

64—9, 23; 287—53